(12) United States Patent
Kamitani (10) Patent No.: US 9,323,719 B2
(45) Date of Patent: Apr. 26, 2016

(54) MATHEMATICAL EXPRESSION INPUT APPARATUS, MATHEMATICAL EXPRESSION MODIFICATION METHOD, AND STORAGE MEDIUM STORING PROGRAM

(71) Applicant: CASIO COMPUTER CO., LTD., Shibuya-ku, Tokyo (JP)

(72) Inventor: Saburo Kamitani, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 321 days.

(21) Appl. No.: 13/868,051

(22) Filed: Apr. 22, 2013

(65) Prior Publication Data

US 2013/0290391 A1    Oct. 31, 2013

(30) Foreign Application Priority Data

Apr. 25, 2012    (JP) .................................. 2012-099920

(51) Int. Cl.
| | |
|---|---|
| *G06F 17/11* | (2006.01) |
| *G06F 17/21* | (2006.01) |
| *G06F 15/02* | (2006.01) |
| *G06F 3/16* | (2006.01) |
| *G10L 15/26* | (2006.01) |

(52) U.S. Cl.
CPC ................ *G06F 17/11* (2013.01); *G06F 3/167* (2013.01); *G06F 15/02* (2013.01); *G06F 17/215* (2013.01); *G10L 15/26* (2013.01)

(58) Field of Classification Search
CPC ...... G06F 15/0225; G06F 15/02; G06F 17/215
See application file for complete search history.

(56) References Cited

U.S. PATENT DOCUMENTS

| | | | | |
|---|---|---|---|---|
| 5,432,721 | A * | 7/1995 | Satoh ............................ | 708/168 |
| 8,073,258 | B2 * | 12/2011 | Yu et al. ....................... | 382/187 |
| 2003/0145284 | A1* | 7/2003 | Fortenberry et al. ......... | 715/517 |
| 2006/0062470 | A1* | 3/2006 | Zhu et al. ...................... | 382/186 |

FOREIGN PATENT DOCUMENTS

JP    2003-255978 A    9/2003

* cited by examiner

*Primary Examiner* — Chuong D Ngo (74) *Attorney, Agent, or Firm* — Holtz, Holtz & Volek PC (57) ABSTRACT

A mathematical expression input apparatus includes a mathematical expression display unit configured to display a mathematical expression, a mathematical expression portion designation unit configured to designate a mathematical expression portion displayed by the mathematical expression display unit in accordance with user operation, and an output unit configured to determine a designation method for a mathematical expression portion designated by the mathematical expression designation unit, modify the mathematical expression in accordance with the designation method, and display the modified mathematical expression.

12 Claims, 7 Drawing Sheets

MATHEMATICAL EXPRESSION INPUT APPARATUS, MATHEMATICAL EXPRESSION MODIFICATION METHOD, AND STORAGE MEDIUM STORING PROGRAM

CROSS-REFERENCE TO RELATED APPLICATIONS

This application is based upon and claims the benefit of priority from prior Japanese Patent Application No. 2012-099920, filed Apr. 25, 2012, the entire contents of which are incorporated herein by reference.

BACKGROUND OF THE INVENTION

1. Field of the Invention

The present invention relates to a mathematical expression input apparatus, a mathematical expression modification method, and a storage medium storing a program, capable of enabling various mathematical expressions to be input.

2. Description of the Related Art

Voice recognition techniques have developed remarkably and have been put to practical use in various fields. For example, when a keyword is input by voice to a mobile terminal that is connectible to the Internet, voice recognition is carried out and a server on the Internet to which the terminal is connected searches for the keyword to provide information.

Thus, it is expected that when a mathematical expression is input to an electronic device having an alpha calculator or a calculation function, the inputting is carried out based on the voice recognition instead of key operations.

When a mathematical expression is input by voice, a manner of delimitation presents a problem.

For example, whether to convert a voice input "sine thirty plus five" into mathematical expression sin (30)+5 or mathematical expression sin (30+5) cannot be determined simply by voice.

For conventional mathematical expression voice input apparatuses, a technique has been proposed which takes a difference in the length of a silent interval in a voice input into account. For example, if the voice input sounds like "sine thirty-plus-five", the input is converted into the mathematical expression sin (30+5). If the voice input contains a long pause after "thirty" as in "sine thirty . . . plus five", the input is converted into sin (30)+5 (see, for example, Jpn. Pat. Appln. KOKAI Publication No. 2003-255978).

The conventional mathematical expression voice input apparatus recognizes a difference in the length of a pause in the voice input to determine the structure of the mathematical expression. However, the resultant input is far from natural reading of a mathematical expression to be input.

BRIEF SUMMARY OF THE INVENTION

Accordingly, it is an object of the present invention to provide a mathematical expression input apparatus and a mathematical expression modification method, capable of enabling an input mathematical expression to be modified into a correct mathematical expression using a simple technique.

According to one aspect of the present invention, there is provided a mathematical expression input apparatus comprising: a mathematical expression display unit configured to display a mathematical expression; a mathematical expression portion designation unit configured to designate a mathematical expression portion displayed by the mathematical expression display unit in accordance with user operation; and an output unit configured to determine a designation method for the mathematical expression portion designated by the mathematical expression designation unit, modify the mathematical expression in accordance with the designation method, and display the modified mathematical expression.

According to the present invention, it is possible to enable an input mathematical expression to be modified into a correct mathematical expression using a simple technique.

Additional obi acts and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
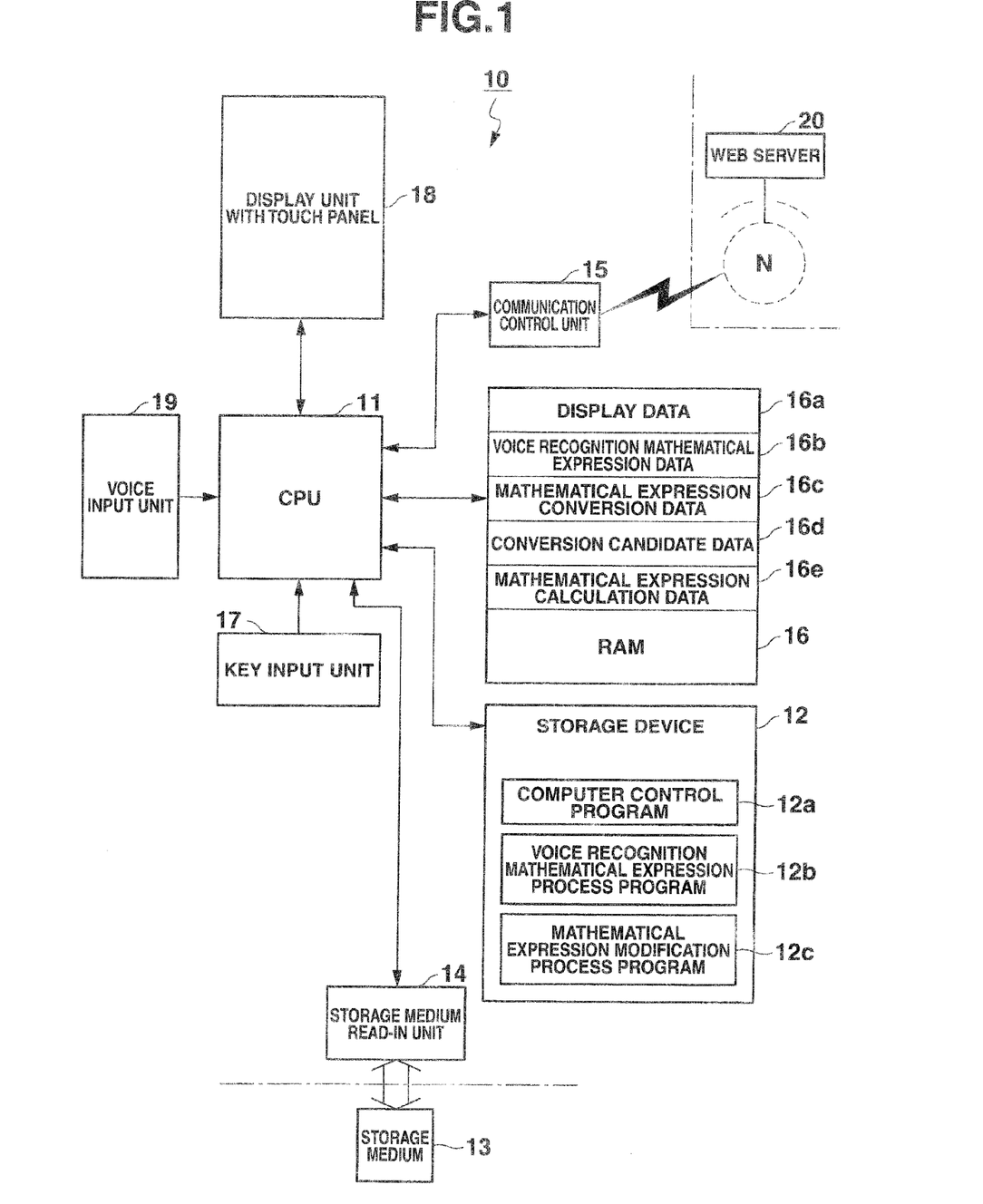
FIG. 1 is a block diagram showing a configuration of an electronic device in a computer 10 including a touch panel according to an embodiment of a mathematical expression input apparatus of the present invention.

FIG. 1 is a block diagram showing a configuration of an electronic circuit in a computer 10 including a touch panel according to an embodiment of a mathematical expression input apparatus of the present invention.

The electronic circuit in the computer 10 includes a control unit (CPU) 11 that is a computer.

The control unit (CPU) 11 controls the operation of the units of the circuit using a RAM 16 as a work memory in accordance with a system program, computer control program 12*a*, a voice recognition mathematical expression process program 12*b*, and a mathematical expression modification process program 12*c* which are pre-stored in a storage device 12. The programs 12*a*, 12*b*, and 12*c* may be read from an external storage medium 13 such as a memory card into a storage device 22 via a storage medium read-in unit 14 or downloaded from a Web server (program server) 20 on a communication network N into the storage device 22 via a communication control unit 15.

The computer control program 12*a* controls a process of inputting and displaying various mathematical expressions, a process of carrying out calculations, and the like. The voice recognition mathematical expression process program 12*b* recognizes and converts voice input through a voice input unit 19, into a mathematical expression. The mathematical expression modification process program 12*c* modifies the mathematical expression into which the recognized voice has been converted, in accordance with user operation.

The programs stored in the storage device 22 are initiated in accordance with a key input signal from a key input unit 17, a touch input signal from a display unit 18 with a touch panel, and a voice input signal from the voice input unit 19.

The key input unit 17 includes numeric keys, arithmetic operation keys, and function keys for trigonometric functions and the like.

The voice input unit 19 converts an input voice into a digital signal and outputs the digital signal to the CPU 11.

The RAM 16 includes a display data memory 16*a*, a voice recognition mathematical expression data memory 16*b*, a mathematical expression conversion data memory 16*c*, a conversion candidate data memory 16*d*, a mathematical expression calculation data memory 16*e*, and a work data memory in which various data input to and output from the control unit 11 in connection with various calculation processes are stored as necessary.

The display data memory 16*a* is configured to store data on a bitmap pattern generated in a display screen size and which is to be displayed on the display unit 18 with the touch panel.

The voice recognition mathematical expression data memory 16*b* is configured to store data on a mathematical expression recognized by voice in accordance with the voice recognition mathematical expression process program 12*b*, a mathematical expression with mathematical expression portions (numbers, symbols, and operators) arranged in the order of the voice recognition.

The mathematical expression conversion data memory 16*c* is configured to store data on a mathematical expression with a mathematical expression structure in a natural mathematical expression display form into which the data on the mathematical expression stored in the voice recognition mathematical expression data memory 16*b* has been converted.

The conversion candidate data memory 16*d* is configured to store, in accordance with user operation on a mathematical expression obtained by voice recognition, a mathematical expression generated by the mathematical expression modification process program 12*c* modifying the above-described mathematical expression into a different form, as a mathematical expression as a conversion candidate.

The mathematical expression calculation data memory 16*e* is configured to store data on the calculation in progress in and the result of a process of calculating a mathematical expression stored in the mathematical expression conversion data memory 16*c* or a process of calculating one of the mathematical expressions as conversion candidates stored in the conversion candidate data memory 16*d* which mathematical expression is determined to be a calculation target.

In the computer 10 configured as described above, the CPU 11 controls the operation of the units of the circuit in accordance with instructions described in the programs so that software and hardware operate cooperatively, thus implementing a voice recognition mathematical expression process function.

Now, the operation of the computer 10 configured as described above will be described.

The apparatus is powered on. Then, when a voice recognition mathematical expression calculation mode is selected in an operation mode selection screen (not shown in the drawings) displayed on the display unit 18, the computer control program 12*a* and the voice recognition mathematical expression process program 12*b* are initiated. Then, a wait state is entered in which the voice input unit 19 accepts input voice.

Figure 2:
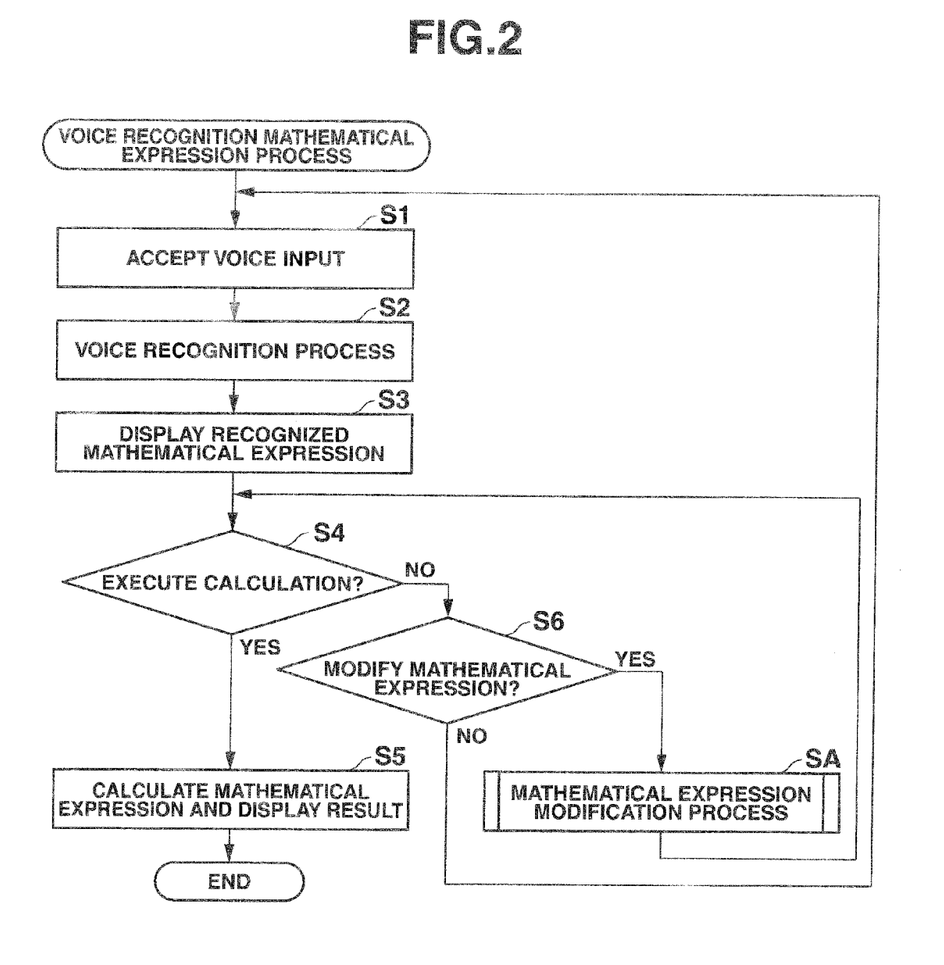
FIG. 2 is a flowchart showing a voice recognition mathematical expression process of the computer 10.
Figure 5:
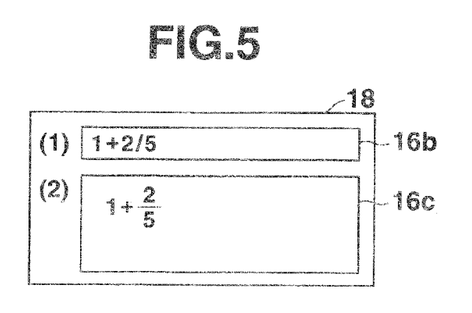
FIG. 5 is a diagram showing a mathematical expression display operation involved in the voice recognition mathematical expression process of the computer 10.

When a user reads a desired mathematical expression, the voice is input through the voice input unit 19 (step S1). The input voice is sequentially recognized (step S2). The mathematical expression recognized by voice is stored in the voice recognition mathematical expression data memory 16*b* so that the portions of the mathematical expression, that is, the numbers, symbols, and operators thereof are each sequentially stored. Then, as shown in FIG. 5, the mathematical expression is displayed in a mathematical expression input area (1) of the touch panel display unit 18. Furthermore, the mathematical expression structure of the mathematical expression stored in the voice recognition mathematical expression data memory 16*b* is determined, and the mathematical expression is converted into a natural mathematical expression display form. The resultant mathematical expression is stored in the mathematical expression conversion data memory 16*c* and displayed in a mathematical expression conversion area (2) of the display unit 18 (step S3).

Now, an example will be described in which the user utters a voice input "one plus two fifths" so that a mathematical expression 1+⅖ recognized by voice is displayed in the mathematical expression input area (1), while a naturally displayed mathematical expression 1+(⅖) is displayed in the mathematical expression conversion area (2). According to the present embodiment, the voice input is such that a fraction is input in the order of display (numerator, vinculum, and denominator) in accordance with a method of key input in a line mode of an alpha calculator.

Then, when the user utters a voice input "calculate" to instruct the computer 10 to execute a calculation (step S4 [Yes]), a process of calculating the mathematical expression 1+(⅖) displayed in the mathematical expression conversion area (2) is carried out. The result of the calculation is stored in the mathematical expression calculation data memory 16*e* and displayed on the display unit 18 (step S5).

On the other hand, if the mathematical expression 1+(⅖) displayed in the mathematical expression conversion area (2)

has been subjected to an incorrect conversion, the user utters, for example, a voice input "modify". Then, the computer 10 determines that the computer 10 has been instructed to modify the mathematical expression (step S6 [Yes]). The mathematical expression modification process program 12c is initiated, and the process is shifted to a mathematical expression modification process shown in FIG. 3 (step SA).

Figure 6A:
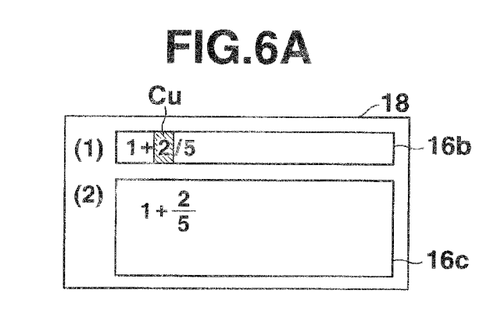
FIGS. 6A and 6B are diagrams showing a mathematical expression display operation performed when an error is corrected by re-inputting a mathematical expression portion in association with the mathematical expression modification process of the computer 10.
Figure 6B:
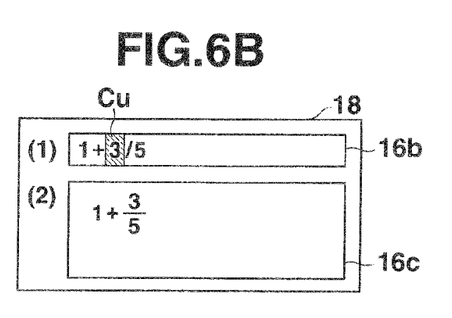

FIG. 6A and FIG. 6B are diagrams showing the operation of the mathematical expression modification process carried out when an erroneous portion of the mathematical expression is re-input to the computer 10 for modification.

If the user modifies the numeric portion "2" of the mathematical expression 1+(2/5) displayed in the mathematical expression conversion area (2) of the display unit 18 with the touch panel, to "3", the user touches the number "2", which is a number portion of the mathematical expression 1+2/5 displayed in the mathematical expression input area (1), as shown in FIG. 6A. A cursor Cu is displayed at the touched number. When the computer 10 determines that the number has been touched for a given time or longer (step A1 [Yes]→step A4 [Yes]), the number "2", touched and held for a certain time, is erased. (step A5).

Then, when the user's voice input "three" is uttered through the voice input, unit 19 or a number key "3" is input, the mathematical expression 1+2/5 stored in the voice recognition mathematical expression data memory 16b is modified to 1+3/5, which is displayed in the mathematical expression input area (1) as shown in FIG. 6B. Concurrently, the naturally displayed mathematical expression 1+(2/5) stored in the mathematical expression conversion data memory 16c is also modified to 1+(3/5), which is displayed in the mathematical expression conversion area (2) (step A6).

In this case, similar modification may be carried out by directly designating a portion of the mathematical expression displayed in the mathematical expression conversion area (2) instead of displaying a portion of the mathematical expression displayed in the mathematical expression input area (1).

Figure 7A:
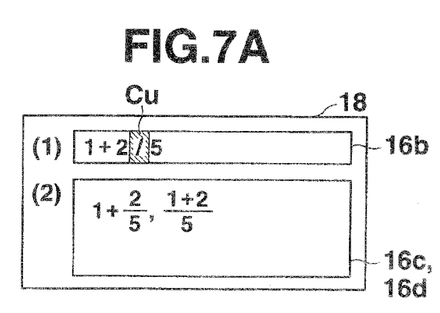
FIGS. 7A and 7B are diagrams showing a mathematical expression display operation performed when an error is corrected by allowing candidates for a range to be incorporated by an operator to be displayed in association with the mathematical expression modification process of the computer 10.
Figure 7B:
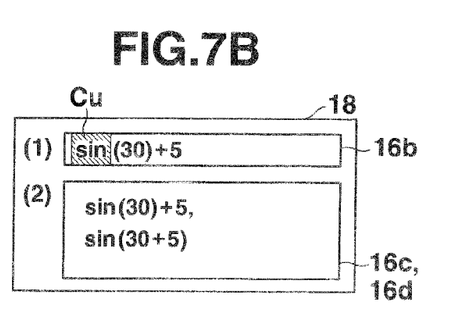

FIG. 7A and FIG. 7B are diagrams showing a mathematical expression modification process operation performed when the computer 10 modifies a mathematical expression by displaying candidates for a range to be incorporated by an operator.

Figure 4:
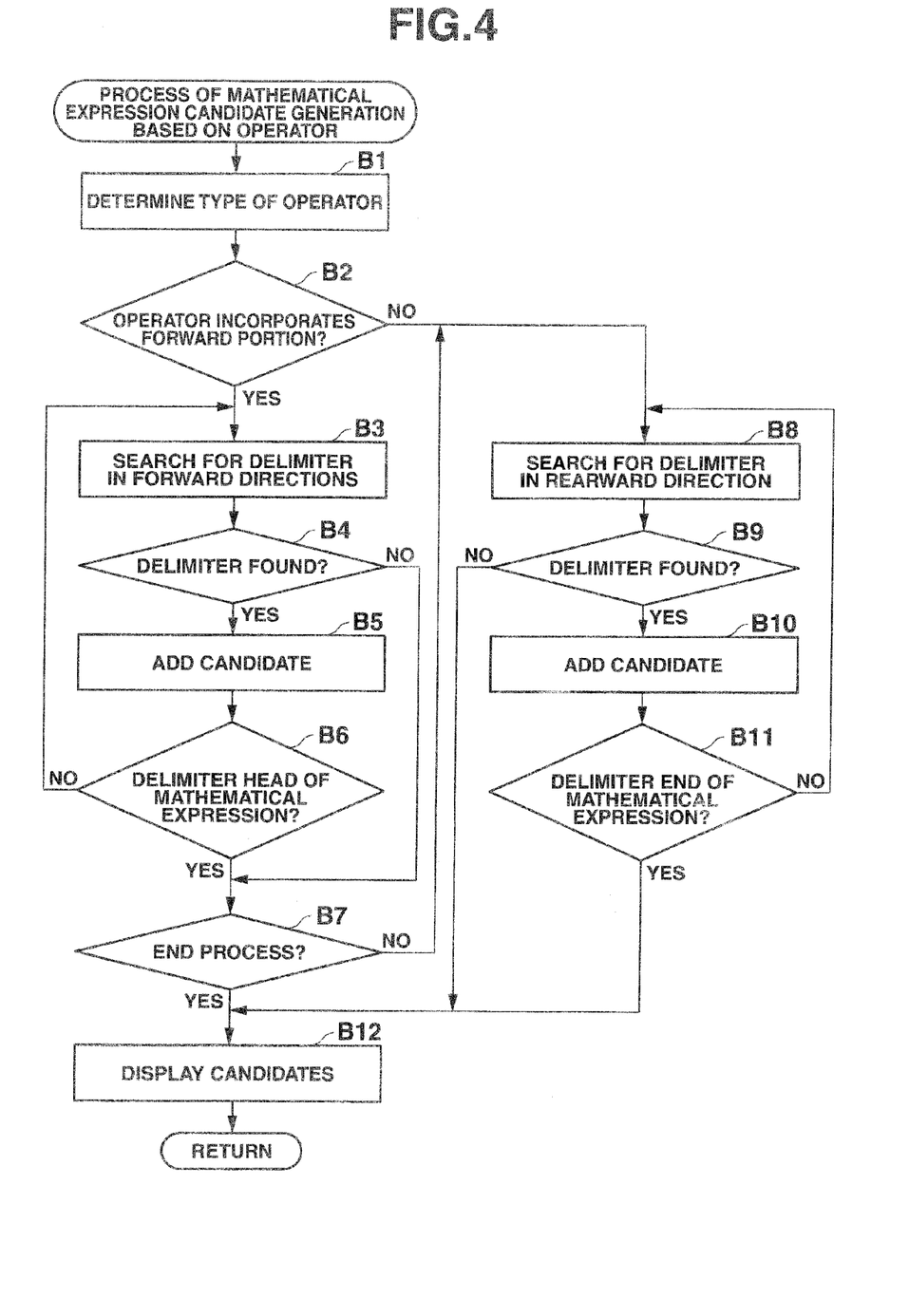
FIG. 4 is a flowchart showing a mathematical expression candidate generation process based on an operator and included in the mathematical expression modification process of the computer 10.

For the mathematical expression 1+(2/5) displayed in the mathematical expression input area (1) as shown in FIG. 5 described above, if the user modifies the part of the mathematical expression which is to be incorporated by the operator "/", the user touches and designates the division operator "/", which is the operator of the mathematical expression, as shown in FIG. 7A. The cursor Cu is displayed at the touched operator. When the operator is determined to have been designated (step A1 [Yes]→step A3 [Yes]), the process is shifted to a process of generating a mathematical expression candidate based on the operator as shown in FIG. 4 (step AB).

In the process of generating a mathematical expression candidate based on the operator, first, the type of the designated operator is determined (step B1). In this case, the type of the operator is determined to be the division operator "/". Then, whether or not the operator incorporates a forward portion of the mathematical expression is determined (step B2).

Then, the designated operator (division operator) "/" is determined to incorporate the forward portion of the mathematical expression (step B2 [Yes]), a delimiter present forward of "2", positioned forward of the operator (division operator) is searched for (step B3). In this case, the mathematical expression portion "1+" is determined to involve a delimiter (B4 [Yes]). Then, the delimited "1+" is incorporated into the numerator to obtain a mathematical expression structure (1+2)/5, which is additionally stored in the conversion candidate data memory 16d (step B5).

Then, when the mathematical expression portion "1+" with the delimiter found is determined to be the head of the mathematical expression (step B6 [Yes]), whether to end the generation of a candidate is determined (step B7). The designated operator (division operator) "/" also incorporates a rearward portion of the mathematical expression, and thus, the process of generating a mathematical expression candidate based on the operator is determined not to be ended (step B7 [No]).

If the mathematical expression portion with the delimiter found is determined not to be the head of the mathematical expression (step B6 [No]), the search is repeated for a delimiter for a further forward portion of the mathematical expression as described above (step B3). Every time a new delimiter is found, a mathematical expression determined in association with the delimiter is additionally stored in the conversion candidate data memory 16d as a conversion candidate (step B4 [Yes]→step B5).

In step 37 described above, when the process of generating a mathematical expression candidate is determined not to be ended (step B7 [No]), a delimiter (a delimiter for a number or a symbol) for a mathematical expression portion present rearward of "5", positioned rearward of the designated operator (division operator) "/", is searched for (step B8).

Here, the mathematical expression portion present rearward of "5" is determined not to involve a delimiter (step B9 [No]). The generation of a mathematical expression candidate ends. Then, the mathematic expression (1+2)/5 as a conversion candidate stored in the conversion candidate data memory 16d is additionally displayed in the mathematical expression conversion area (2) as shown in FIG. 7A (step B12).

In steps B8 and B9 described above, if a delimiter is found for a mathematical expression portion present rearward of the designated operator (step B9 [Yes]), a mathematical expression with a mathematical expression structure determined in association with the delimiter is additionally stored in the conversion candidate data memory 16d as a conversion candidate (step B10).

Then, the search for a delimiter is similarly repeated until the mathematical expression portion with the delimiter found is determined to be the end of the mathematical expression (step 311 [No]→step A8). Every time a mathematical expression determined in association with the delimiter is additionally stored in the conversion candidate data memory 16d (step B9 [Yes]→step B10).

As shown in FIG. 7A, with a plurality of mathematical expressions displayed in the mathematical expression conversion area (2) as candidates, when the user selects the desired mathematical expression (1+2)/5, the mathematical expression 1+(2/5) initially obtained by voice recognition is modified to (1+2)/5 (step A7).

Furthermore, for example, as shown in FIG. 7B, a mathematical expression sin 30+5 is recognized by voice, and a mathematical expression sin (30)+5 is displayed in the mathematical expression conversion area (2) (steps S1 to S3). Then, if the user modifies the part of the mathematical expression which is to be incorporated by the operator "sin", the user designates the operator "sin". When the operator is determined to have been designated (step A1 [Yes]→step A3 [Yes]), the process is shifted to a process of generating a mathematical expression candidate based on the operator as shown in FIG. 4 (step AB).

In the process of generating a mathematical expression candidate based on the operator, first, the designated operator is determined to be "sin" (step B1), and "sin" is determined not to be an operator that incorporates a forward portion of the mathematical expression (step B2 [No]).

Then, a delimiter (a delimiter for a number or a symbol) for a mathematical expression portion present rearward of "30", positioned rearward of the operator "sin", is searched for (step B8).

Then, a delimiter is found for a mathematical expression portion "+5" (step B8 and step B9 [Yes]). A mathematical expression sin (30+5) with a mathematical expression structure determined in association with the delimiter is additionally stored in the conversion candidate data memory 16$d$ as a conversion candidate (step B10).

Then, when the mathematical expression portion "+5" with the delimiter found is determined to be the end of the mathematical expression (step B11 [Yes]), the naturally displayed mathematical expression sin (30+5) as a conversion candidate stored in the conversion candidate data memory 16$d$ is displayed in the mathematical expression conversion area (2) in addition to the naturally displayed mathematical expression sin (30)+5 (step B12) already displayed in the mathematical expression conversion area (2), as shown in FIG. 7B.

When the user selects the mathematical expression candidate sin (30+5) displayed in the mathematical expression conversion area (2), the mathematical expression sin (30)+5 recognized by voice is modified into the desired mathematical expression (step A7).

Thus, if the mathematical expression portion to be incorporated by the operator included in the mathematical expression is to be modified, mathematical expression candidates with different ranges of incorporation are generated and displayed simply by designating the operator to be modified. Therefore, a mathematical expression candidate with the range of incorporation modified to the desired range can be easily selected and entered.

In the process of generating a mathematical expression candidate based on the operator, if the mathematical expression involves many delimiters for mathematical expression portions present forward and rearward of the designated operator and which can be incorporated by the operator, leading to generation of many conversion candidates for the mathematical expression to preclude all the mathematical expression candidates from being displayed in the mathematical expression conversion area (2), then each candidate for the mathematical expression is displayed so as to be scrollable.

Figure 8A:
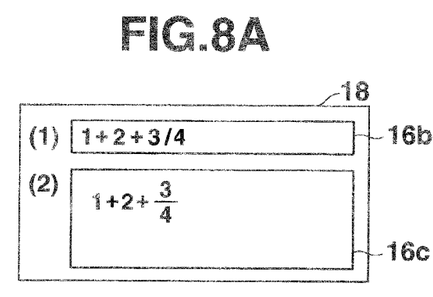
FIGS. 8A and 8B are diagrams showing a mathematical expression display operation performed when an error is corrected by enclosing the range of a mathematical expression portion in parentheses in association with the mathematical expression modification process of the computer 10.
Figure 8B:
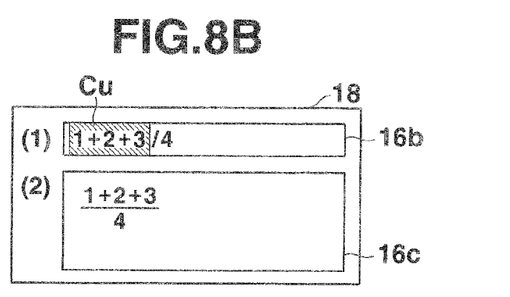

FIG. 8A and FIG. 8B are diagrams showing a mathematical expression modification process operation performed when the computer 10 corrects an error by allowing the user to designate the range of a mathematical expression portion.

It is assumed that, after the voice input acceptance process (step S1) and the voice recognition process (step S2), a mathematical expression 1+2+¾ recognized by voice is displayed in the mathematical expression input area (1) of the display unit 18, while a mathematical expression 1+2+(¾) is displayed in the mathematical expression conversion area (2), as shown in FIG. 8A (step S3).

If the user modifies the range of a mathematical expression portion which corresponds to a numerator, the user designates the part "1+2+3" of the mathematical expression 1+2+¾ displayed in the mathematical expression input area (1) with the user's finger or a stylus as shown in FIG. 8B. Then, the designated part is highlighted. When the part to be modified is determined to have been designated (step A1 [Yes]→step A2 [Yes]), the part "1+2+3" of the mathematical expression 1+2+¾ is enclosed in parentheses and determined to be a mathematical expression structure corresponding to a numerator. The thus modified mathematical expression (1+2+3)/4 is displayed in the mathematical expression conversion data memory 16$c$ and displayed in the mathematical expression conversion area (2) (step A8).

Thus, if a part of a mathematical expression converted by voice recognition which part is to be enclosed in parentheses as a mass of mathematical expression portion, simply designating this range of a mathematical expression portion to be enclosed in parentheses allows the mathematical expression to be easily modified so that the designated range of a mathematical expression portion is enclosed in parentheses.

Figure 9A:
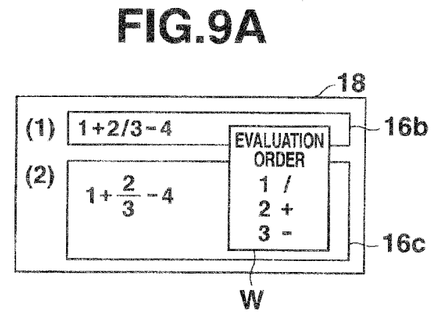
FIGS. 9A and 9B are diagrams showing a mathematical expression display operation performed when an error is corrected by specifying the order of evaluation in association with the mathematical expression modification process of the computer 10.
Figure 9B:
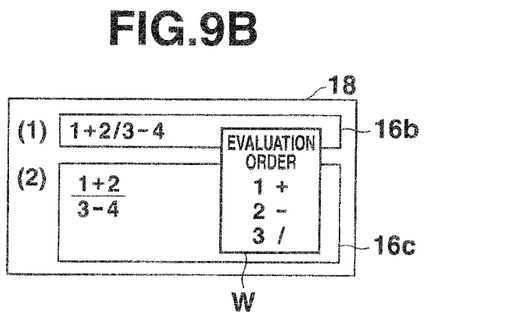

FIG. 9A and FIG. 9B are diagrams showing a mathematical expression modification process operation performed when the computer 10 corrects an error in the mathematical expression by specifying the order of evaluation.

It is assumed that after the voice input acceptance process (step S1) and the voice recognition process (step S2), a mathematical expression 1+⅔−4 recognized by voice is displayed in the mathematical expression input area (1) of the display unit 18 and that the mathematical expression structure of the mathematical expression 1+⅔−4 is determined and the mathematical expression is converted into a natural display form "1+(⅔)−4)", which is displayed in the mathematical expression conversion area (2), as shown in FIG. 8A (step S3).

Here, if the user modifies the structure of the mathematical expression based on the order of evaluation (step S6 [Yes] →step SA), the user performs a predetermined operation to specify that the mathematical expression be modified based on the order of evaluation. When the modification based on the order of evaluation is specified (step A1 [No]→step A9 [Yes]), an evaluation order window displayed in which operators included in the mathematical expression 1+(⅔)−4 are expressed in association with the order of evaluation (step A10). Then, "1 [/], 2 [+], 3 [−]" is displayed.

The order of the operators expressed in the evaluation order window W is changed by touching rid dragging the operators or designating and overwriting the operators with the cursor Cu. Then, the mathematical expression converted modified into a mathematical expression with the changed order of the operators (step A11).

For example, when the division symbol "/" is touched and dragged to the bottom line, the evaluation order window W is changed to "1 [+], 2 [−], 3 [/]" as shown in FIG. 9B. Then, the mathematical expression 1+(⅔)−4 is converted into a mathematical expression (1+2)/(3−4) associated with the changed order of evaluation, which is displayed in the mathematical expression conversion area (2) (step A11).

Thus, if the mathematical expression structure of a mathematical expression converted by voice recognition is to be changed based on the order of evaluation for the mathematical expression, the mathematical expression can be easily modified into a structure associated with the desired order of evaluation simply by changing the order of operators included in the mathematical expression in the evaluation order window W displayed by designating a modification mode.

FIG. 10A, FIG. 10B, FIG. 10C, FIG. 10D show a mathematical expression display operation according to another embodiment performed when the computer corrects an error by displaying candidates for the range of incorporation on the computer 10.

Figure 10A:
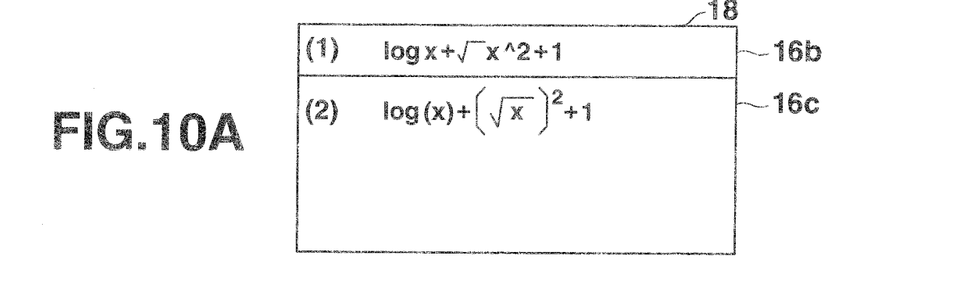
FIGS. 10A, 10B, 10C, and 10D are diagrams showing a mathematical expression display operation according to another embodiment performed when an error is corrected by displaying candidates for a range to be incorporated by an operator in association with the mathematical expression modification process of the computer 10.

For example, if a mathematical expression log [x+√(x$^2$+1)] is to be input, a voice input "log x plus root x squared plus one" is uttered. Then, as shown in FIG. 10A, a mathematical expression log x+√x squared+1 recognized from voice is stored in the voice recognition mathematical expression data memory 16$b$ and displayed in the mathematical expression input area (1). Furthermore, the mathematical expression is converted into a natural mathematical expression display form, and a mathematical expression $\log(x)+[\sqrt{x}]^2+1$ is stored in the mathematical expression conversion data memory 16c and displayed in the mathematical expression conversion area (2) (steps S1 to S3).

First, the operator "√" is designated in order to modify a part of the mathematical expression to be incorporated by the operator "√". When the operator is determined to have been designated (step A1 [Yes]→step A3 [Yes]), the process is shifted to a process of generating a mathematical expression candidate based on the operator as shown in FIG. 4, as described above (step AB).

In the process of generating a mathematical expression candidate based on the operator, first, the designated operator is determined to be "√" (step B1), and "√" is determined not to be an operator that incorporates a forward portion of the mathematical expression (step B2 [No]).

Then, a delimiter (a delimiter for a number or a symbol) for a mathematical expression portion present rearward of "x" being incorporated by "√" is searched for (step B8).

Then, a delimiter is found for a mathematical expression portion "2" present rearward of "x" (step B8 and step B9 [Yes]). In association with the delimiter, a mathematical expression $\log(x)+\sqrt{(x^2)}+1$ is additionally stored in the conversion candidate data memory 16d as a conversion candidate (step B10).

Moreover, a delimiter is found for a mathematical expression portion "+1" present rearward of "x²" (step N8 and step B9 [Yes]). In association with the delimiter, a mathematical expression $\log(x)+\sqrt{(x^2+1)}$ is also additionally stored in the conversion candidate data memory 16d as a conversion candidate (step B10).

Figure 10B:
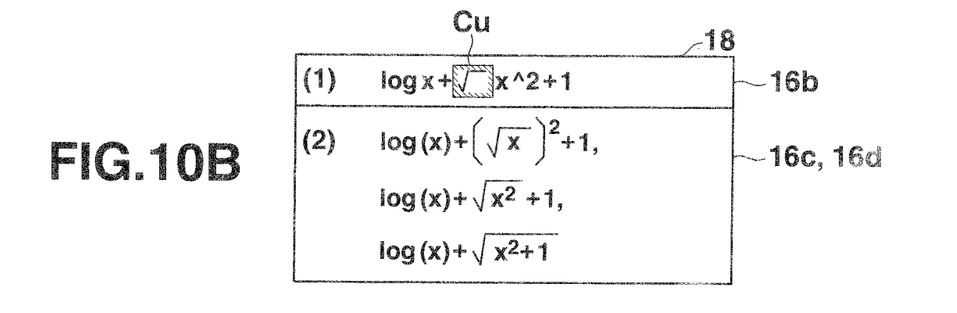

As a result, as shown in FIG. 10B, the two mathematical expressions as conversion candidates "$\log(x)+\sqrt{(x^2)}+1$" and "$\log(x)+\sqrt{(x^2+1)}$" additionally stored in the conversion candidate data memory 16d are additionally displayed in the mathematical expression conversion area (2) (step B12).

The user then selects the mathematical expression $\log(x)+\sqrt{(x^2+1)}$, in which the mathematical expression portion to be incorporated by "√" is modified (step A7), and further touches and designates the operator "log" (steps A1 [Yes]→step A3 [Yes]). Then, a process of generating mathematical expression candidate based on the operator is carried out as described above (step AB).

That is, the designated operator is determined to be "log" (step B1), and "log" is determined not to be an operator that incorporates a forward portion of the mathematical expression (step B2 [No]). A rearward delimiter for "x" is searched for (step B8). Then, a delimiter is found for a mathematical expression portion "+√(x²+1)" (step B8 and step B9 [Yes]). In association with the delimiter, a mathematical expression log $[x+\sqrt{(x^2+1)}]$ is additionally stored in the conversion candidate data memory 16d as a conversion candidate (step B10).

Figure 10C:
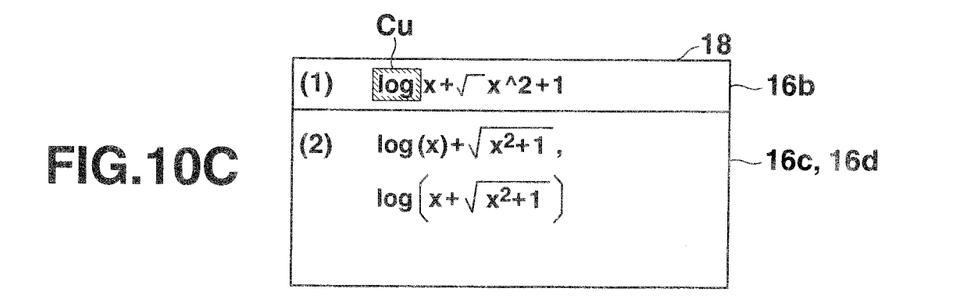

Then, when the mathematical expression portion $+\sqrt{(x^2+1)}$ is determined to be the end of the mathematical expression (step B11 [Yes]), the mathematical expression log $[x+\sqrt{(x^2+1)}]$ is additionally displayed in the mathematical expression conversion area (2) as a conversion candidate, as shown in FIG. 10C (step B12).

Figure 10D:
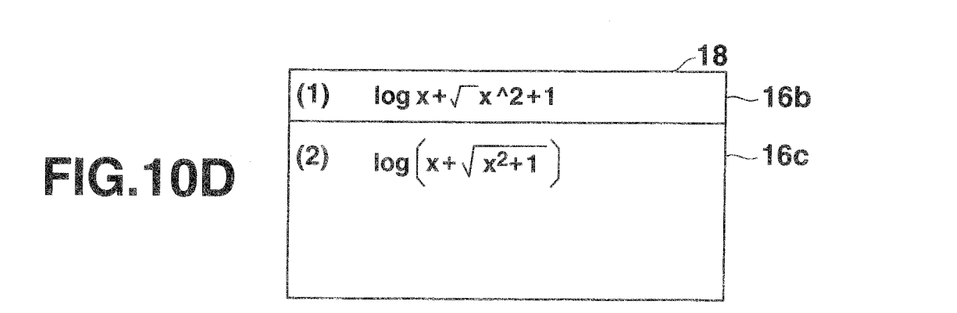

When the user subsequently selects the added mathematical expression candidate, the user's desired mathematical expression log $[x+\sqrt{(x^2+1)}]$ is obtained in which the mathematical expressions to be incorporated by the designated operators "√" and "log" are modified, as shown in FIG. 10D (step A7).

Thus, even if mathematical expression portions to be incorporated into a respective plurality of operators in a mathematical expression converted by voice recognition are to be individually modified, simply sequentially designating the modification target operators allows a mathematical expression candidate with a different range of incorporation to be generated and displayed every time a modification target operators is designated. Therefore, a mathematical expression candidate with the range of incorporation modified into the desired range can be selected and entered.

Thus, a mathematical expression can not only be easily input by voice recognition, but if the input mathematical expression is erroneous, can also be modified into a correct mathematical expression using an appropriate technique in accordance with the manner of user operation on the mathematical expression.

Figure 3:
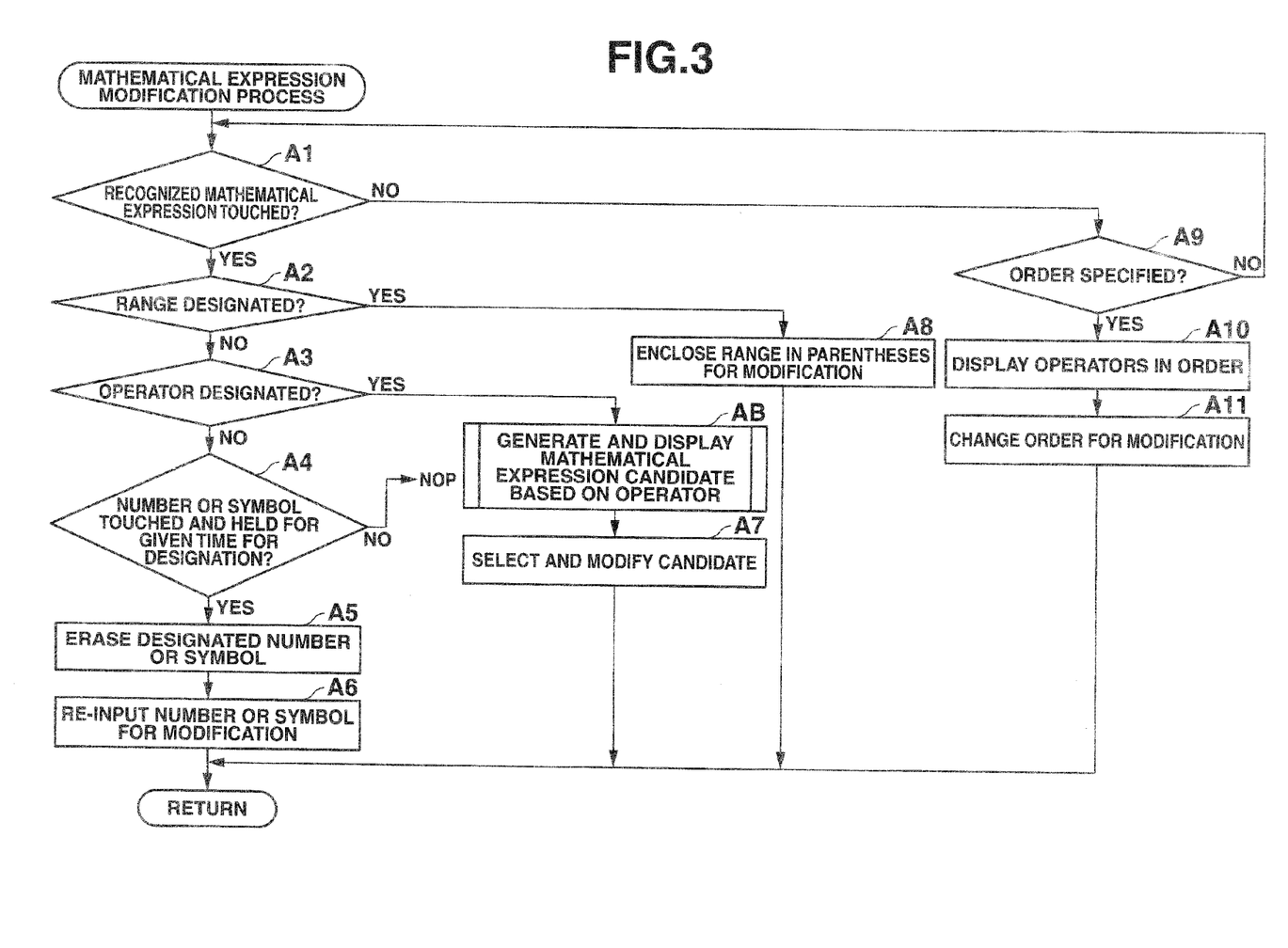
FIG. 3 is a flowchart showing a mathematical expression modification process included in the voice recognition mathematical expression process of the computer 10.

The techniques for the processes described in the embodiment and carried out by the computer 10 can be stored, for distribution, the external storage medium (13) such as a memory card (a ROM card, a RAM card, or the like), a magnetic disk (a floppy Disk®, a hard disk, or the like), an optical disc (CD-ROM, DVD, or the like), or a semiconductor memory, as programs that can be executed by the computer; the techniques involve the voice recognition mathematical expression process shown in the flowchart in FIG. 2, the mathematical expression modification process included in the voice recognition mathematical expression process and shown in the flowchart in FIG. 3, the process of operator-based mathematical expression candidate generation included in the mathematical expression modification process and shown in the flowchart in FIG. 4, and the like. The computer (CPU 11) of the electronic computer (10) with the touchpanel display unit (18) and the voice input unit (19) can read any of the programs stored in the external storage medium (13) into the storage device (12) so that the read program controls the operation. Thus, the mathematical expression modification function associated with the voice recognition mathematical expression process described in the embodiment can be implemented, allowing similar processes based on the above-described techniques to be executed.

Furthermore, program data used to implement the techniques can be transmitted on the communication network N in the form of program codes. The program data can be loaded from the computer apparatus (program server 20) connected to the communication network N into the electronic computer (10) with the touch panel display unit (18) and the voice input unit (19) and stored in the storage device (12). Thus, the mathematical expression modification function associated with the above-described voice recognition mathematical expression process can be implemented.

The present invention is not limited to the above-described embodiment, and in practice, the embodiment may be varied without departing from the spirits of the invention. Moreover, the embodiment includes various levels of invention, and various aspects of the invention may be extracted by combining a plurality of the constituent requirements disclosed. For example, the object can be accomplished even when some constituent requirements are deleted from all the constituent requirements illustrated in the embodiment or when some of the constituent requirements are combined together into a different form. Configurations subjected to deletion or combination of the constituent requirements can be extracted as aspects of the invention provided that the configurations exert the effects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mathematical expression input apparatus comprising:
a display unit; and
a processor which comprises a CPU and which executes:
- a mathematical expression display process of displaying an input mathematical expression on the display unit,
- a determination process of determining whether or not a number or an operator included in the mathematical expression displayed by the mathematical expression display process is designated by a user,
- a selection process of, when it is determined that the operator included in the displayed mathematical expression is designated by the user, displaying plural mathematical expression candidates with different ranges of incorporation of the designated operator to urge the user to select one of the displayed mathematical expression candidates, and modifying the displayed mathematical expression into a form corresponding to the selected mathematical expression candidate,
- a replacement process of, when it is determined that the number included in the mathematical expression is designated by the user, allowing the user to re-input said number, without displaying the plural mathematical expression candidates, and replacing the designated number in the mathematical expression with the re-input number,
- a window display process of, when the mathematical expression is being displayed by the mathematical expression display process, displaying operators included in the mathematical expression in an order in a window, and
- an order change process of, when the order of the operators displayed in the window is changed in accordance with an operation by the user, modifying the mathematical expression in accordance with the changed order of the operators.

2. The mathematical expression input apparatus according to claim 1, wherein the processor further executes:
- a process of determining whether or not a partial range of the mathematical expression displayed by the mathematical expression display process is designated by the user, and
- a parenthesis process of, when it is determined that the partial range of the mathematical expression is designated, modifying the mathematical expression by enclosing the designated partial range of the mathematical expression in parentheses.

3. The mathematical expression input apparatus according to claim 1, wherein the processor further executes a voice recognition process of performing a voice recognition on a voice of the user and modifying the voice into the mathematical expression,
wherein the mathematical expression display process includes displaying the mathematical expression obtained through the voice recognition on the display unit.

4. The mathematical expression input apparatus according to claim 1, wherein in the window display process, the operators included in the displayed mathematical expression are displayed in an order of evaluation in the window.

5. A mathematical expression modification method for a mathematical expression input apparatus having a display unit, the method comprising:
displaying an input mathematical expression on the display unit,
determining whether or not a number or an operator included in the displayed mathematical expression is designated by a user,
when it is determined that the operator included in the displayed mathematical expression is designated by the user, displaying plural mathematical expression candidates with different ranges of incorporation of the designated operator to urge the user to select one of the displayed mathematical expression candidates, and modifying the displayed mathematical expression into a form corresponding to the selected mathematical expression candidate,
when it is determined that the number included in the mathematical expression is designated by the user, allowing the user to re-input said number, without displaying the plural mathematical expression candidates, and replacing the designated number in the mathematical expression with the re-input number,
when the mathematical expression is being displayed, displaying operators included in the mathematical expression in an order in a window, and
when the order of the operators displayed in the window is changed in accordance with an operation of the user, modifying the mathematical expression in accordance with the changed order of the operators.

6. The mathematical expression modification method according to claim 5, further comprising:
determining whether or not a partial range of the displayed mathematical expression is designated by the user, and
when it is determined that the partial range of the displayed mathematical expression is designated, modifying the mathematical expression by enclosing the designated partial range of the mathematical expression in parentheses.

7. The mathematical expression modification method according to claim 5, further comprising performing a voice recognition on a voice of the user and modifying the voice into the mathematical expression,
wherein the mathematical expression displayed in the display unit is obtained through the voice recognition.

8. The mathematical expression modification method according to claim 5, wherein in the displaying of the operators in the window, the operators included in the displayed mathematical expression are displayed in an order of evaluation in the window.

9. A non-transitory computer-readable storage medium having stored thereon a program for a computer of an electronic device comprising a display unit, the program causing the computer to perform functions comprising:
displaying an input mathematical expression on the display unit,
determining whether or not a number or an operator included in the displayed mathematical expression is designated by a user,
when it is determined that the operator included in the displayed mathematical expression is designated by the user, displaying plural mathematical expression candidates with different ranges of incorporation of the designated operator to urge the user to select one of the displayed mathematical expression candidates, and modifying the displayed mathematical expression into a form corresponding to the selected mathematical expression candidate,
when it is determined that the number included in the mathematical expression is designated by the user, allowing the user to re-input said number, without displaying the plural mathematical expression candidates, and replacing the designated number in the mathematical expression with the re-input number, when the mathematical expression is being displayed, displaying operators included in the mathematical expression in an order in a window, and when the order of the operators displayed in the window is changed in accordance with an operation of the user, modifying the mathematical expression in accordance with the changed order of the operators.

10. The non-transitory computer-readable storage medium according to claim 9, wherein the program further causes the computer to perform functions comprising:

determining whether or not a partial range of the displayed mathematical expression is designated by the user, and when it is determined that the partial range of the displayed mathematical expression is designated, modifying the mathematical expression by enclosing the designated partial range of the mathematical expression in parentheses.

11. The non-transitory computer-readable storage medium according to claim 9, wherein the program further causes the computer to perform a function comprising performing a voice recognition on a voice of the user and modifying the voice into the mathematical expression, wherein the mathematical expression displayed in the display unit is obtained through the voice recognition.

12. The non-transitory computer-readable storage medium according to claim 9, wherein in the displaying of the operators in the window, the operators included in the displayed mathematical expression are displayed in an order of evaluation in the window.

* * * * *